Feb. 16, 1960 W. VAN DER SLUYS 2,925,051
SOUND BARRIER FOR PASSENGER VEHICLES
Filed Feb. 16, 1956 3 Sheets-Sheet 1
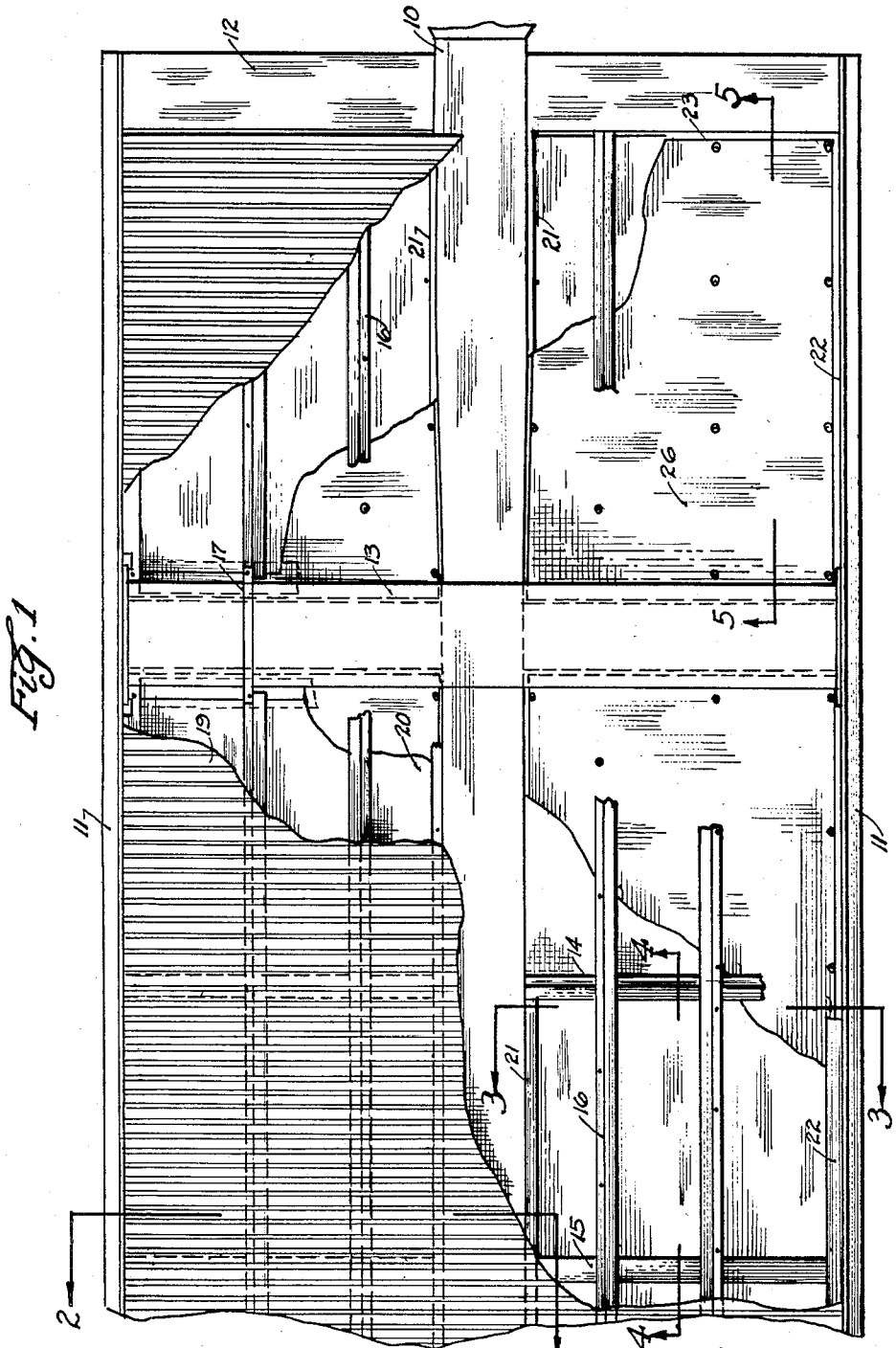
Inventor
William Van Der Sluys
By Wayne Morris
Atty.

Feb. 16, 1960  W. VAN DER SLUYS  2,925,051
SOUND BARRIER FOR PASSENGER VEHICLES
Filed Feb. 16, 1956  3 Sheets-Sheet 2
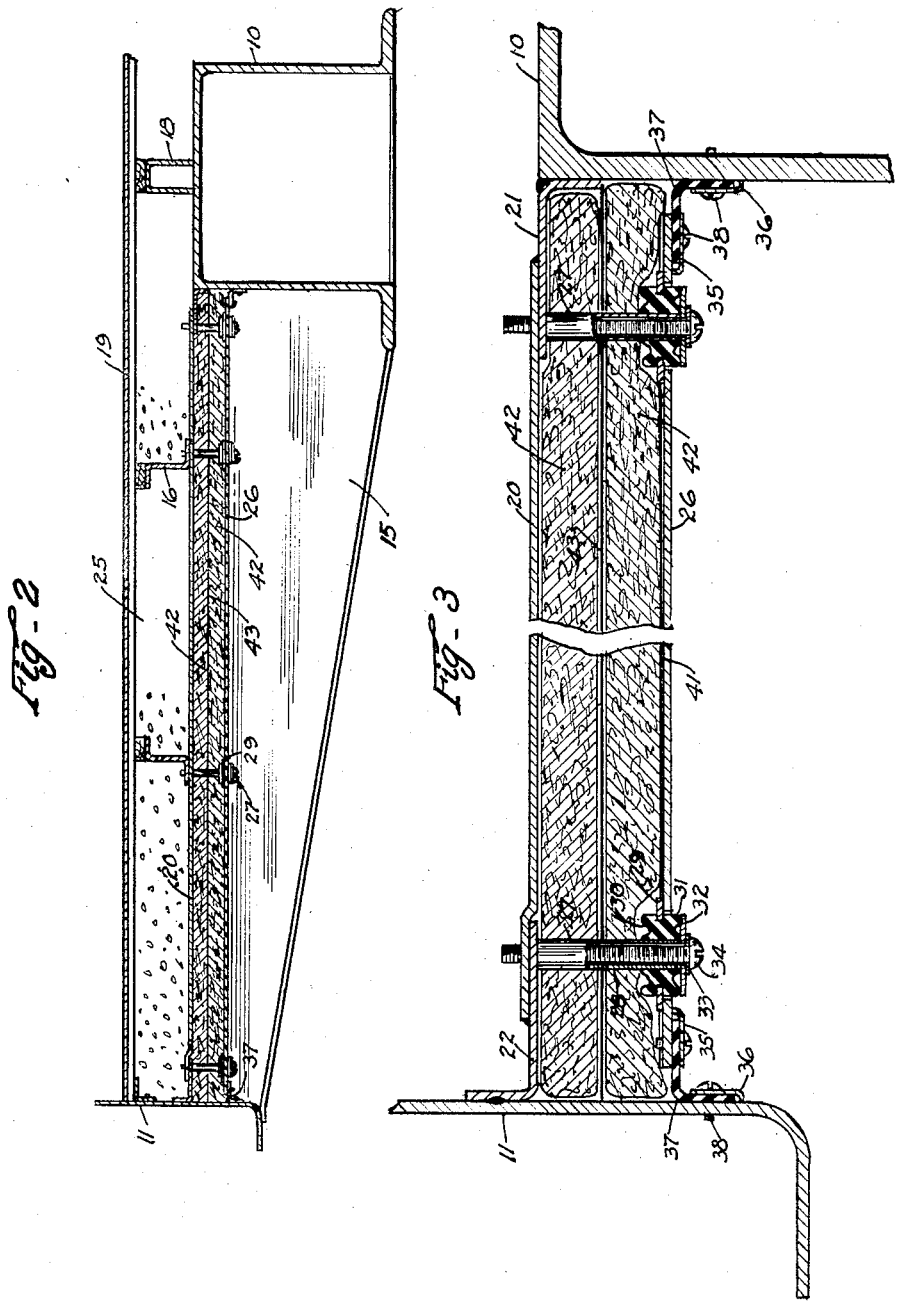
Inventor
William Van Der Sluys
By Wayne Morris Russell
Atty.

Feb. 16, 1960 W. VAN DER SLUYS 2,925,051
SOUND BARRIER FOR PASSENGER VEHICLES
Filed Feb. 16, 1956 3 Sheets-Sheet 3
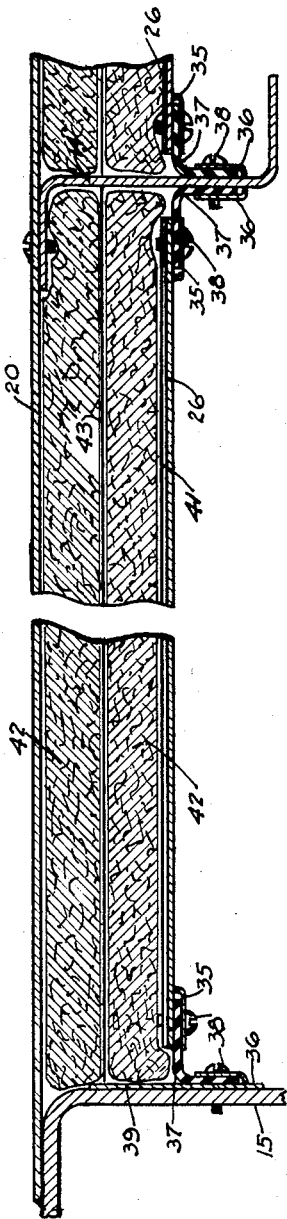
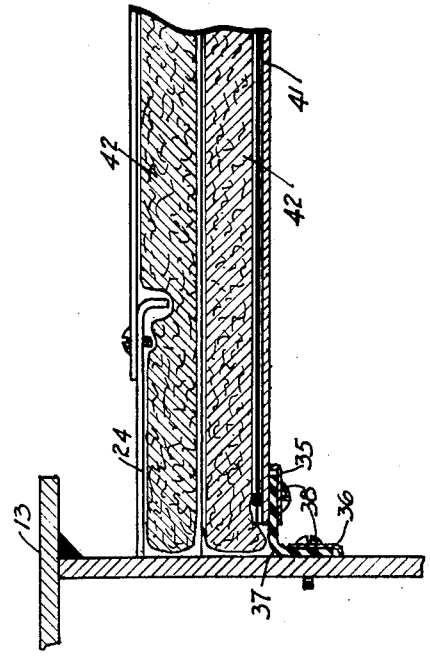
Inventor
William Van Der Sluys
By Wayne Morris Russell
Atty.

United States Patent Office 2,925,051
Patented Feb. 16, 1960

2,925,051

SOUND BARRIER FOR PASSENGER VEHICLES

William Van Der Sluys, Chicago, Ill., assignor to Pullman Incorporated, a corporation of Delaware Application February 16, 1956, Serial No. 565,844

7 Claims. (Cl. 105—452)

This invention relates to passenger vehicles and is primarily concerned with a sound barrier arrangement for a railway passenger car.

The principal object of the invention is to provide a sound barrier for a passenger vehicle to prevent external noises from getting through the vehicle structure.

Another object of the invention is to provide a horizontally disposed layer of material secured to the passenger vehicle structure and another horizontally disposed layer of material having its edges spaced from the vehicle structural members to prevent transmission of sound waves to the vehicle structure and flexible connections between the edges of the second named layer and the vehicle structural members to prevent transmission of mechanical vibrations in the layer to the vehicle structure and sound insulation between the first and second named layers to absorb vibrations that bounce between the layers.

Another object of the invention is to provide in a passenger vehicle having the usual floor and the usual subfloor below the floor an auxiliary floor below the subfloor having its edges spaced from the vehicle structural members to prevent transmission of sound waves to the vehicle structure and flexible connections between the edges of the auxiliary floor and the vehicle structural members to prevent transmission of mechanical vibrations in the auxiliary floor to the vehicle structure and sound insulation between the subfloor and the auxiliary floor to absorb vibrations that bounce between the subfloor and the auxiliary floor.

Another object of the invention is to provide a horizontally disposed sound barrier layer having its edges spaced from the car structural members and flexible connections between the edges of the layer and the structural members each comprising a metal strip on the layer along its respective edge and a metal strip on the respective structural member and a strip of rubberized fabric between the layer and its metal strip and between the structural member and its metal strip to prevent transmission of mechanical vibrations from the layer to the car structure.

Another object of the invention is to provide a horizontally disposed layer of material secured to the car structure and a horizontally disposed sound barrier layer below the first named layer and a plurality of means supporting the second named layer from the first named layer and each of the means comprising a sleeve extending through the second named layer and having one end disposed against the first named layer and flexible washers disposed on the sleeve and against opposite faces of the second named layer and a securing element extending through the second named layer and the sleeve and the first named layer so that vibrations will not be transmitted from the second named layer to the first named layer.

A more specific object of the invention is to provide in a railway passenger car the usual floor and the usual subfloor below the floor and an auxiliary floor having its edges spaced from the car structural members and disposed below the subfloor and a plurality of means supporting the auxiliary floor from the subfloor and flexible connections between the edges of the auxiliary floor and the structural members and sound insulation between the auxiliary floor and the subfloor to provide a sound barrier.

The foregoing and other objects of the invention will be apparent from the construction and arrangement illustrated in the accompanying drawings wherein Fig. 1 is a plan view of the lower end portion of a railway passenger car with the floor and subfloor being broken away;

Fig. 2 is a cross sectional view through a portion of the car taken on the line 2—2 of Fig. 1;

Fig. 3 is an enlarged broken cross sectional view through a portion of the car taken on the line 3—3 of Fig. 1 and showing the sound barrier arrangement;

Fig. 4 is an enlarged broken longitudinal sectional view through a portion of the car taken on the line 4—4 of Fig. 1; and Fig. 5 is an enlarged broken longitudinal sectional view through a portion of the car taken on the line 5—5 of Fig. 1.

In railway passenger cars the noise from the trucks goes through the car structure into the interior of the car. This noise coming into the interior of the car causes annoyance to passengers resulting in discomfort. Over a period of many years various arrangements have been devised to stop this noise but all have been ineffective. The invention proposes a sound barrier to prevent this noise from getting into the interior of the car. The invention is comprised of an auxiliary floor spaced below the usual subfloor and having its edges spaced from the car structural members. A plurality of means support the auxiliary floor from the subfloor and flexible connections are provided between the edges of the auxiliary floor and the car structural members and sound insulation is disposed between the auxiliary floor and the subfloor. The auxiliary floor prevents transmission of sound waves to the car structure and the flexible connections prevent transmission of mechanical vibrations from the auxiliary floor to the car structure and the plurality of means prevent vibrations from being transmitted from the auxiliary floor to the subfloor and the sound insulation absorbs vibrations that bounce between the auxiliary floor and the subfloor.

In the drawings, a passenger vehicle is illustrated in the form of a railway passenger car. The car has a center sill 10, side sills 11, and a plurality of cross members including end sills 12, bolsters 13, floor beams 14, and crossbearers 15. Each end sill 12 is made up of two parts and each part extends between and is secured to the center sill 10 and the adjacent side sill 11. Each bolster 13 is made up of a bottom cover plate extending between the side sills 11 and under the center sill 10 and secured to the side sills and the center sill and two pairs of web plates and each web plate extending between and secured to the center sill and the adjacent side sill and a top cover plate extending between the side sills 11 and over the center sill 10 and secured to the side sills and the center sill. Each floor beam 14 is made up of two parts and each part extends between and is secured to the center sill 10 and the adjacent side sill 11. Each crossbearer 15 is made up of two parts and each part is hat-shaped in cross section and extends between and is secured to the center sill 10 and the adjacent side sill 11. Spaced stringers 16 are secured to each end sill 12 and are tied together over the bolster 13 by angles 17 and secured to the bolster and are disposed upon the floor beams 14 and secured to them and are also disposed upon the crossbearers 15 and secured to them. A support 18 is disposed upon and is secured to the center sill 10. A floor 19 is disposed upon the stringers 16 and support 18 and the floor is supported at the side sills 11 by angles secured to the side sills. A metal subfloor sheet 20 extends between the end sill 12 and the bolster 13 and also extends between the center sill 10 and the adjacent side sill 11. A plate 21 having the same length as the respective subfloor sheet 20 is secured to the center sill 10 and supports the subfloor sheet as will be described later. An angle 22 having the same length as the subfloor sheet 20 is secured to the adjacent side sill 11 and supports the outer edge of the subfloor sheet. An angle 23 having the same width as the respective subfloor sheet 20 is secured to the end sill 12 and the subfloor sheet and supports the adjacent edge of the subfloor sheet. A plate 24 having the same width as the respective subfloor sheet 20 is secured to the adjacent web plate of the bolster and to the subfloor sheet and supports the adjacent edge of the subfloor sheet. Another metal subfloor sheet 20 extends between the bolster 13 and the crossbearer 15 over the floor beam 14 and this floor sheet also extends between the center sill 10 and the adjacent side sill 11. Another member 21 in the form of an angle extends between the adjacent web plate of the bolster 13 and the floor beam 14 and is disposed under the adjacent edge of the respective subfloor sheet 20 and is secured to the center sill and the sheet. Another member 21 in the form of an angle extends between the floor beam 14 and the crossbearer 15 and is disposed under the adjacent edge of the respective subfloor sheet 20 and is secured to the center sill and the sheet. Another angle 22 extends between the bolster 13 and the floor beam 14 and has one flange disposed under the adjacent edge of the respective subfloor sheet 20 and is secured to the sheet and the adjacent side sill 11. Another angle 22 extends between the floor beam 14 and the crossbearer 15 and has one flange disposed under the adjacent edge of the respective subfloor sheet 20 and is secured to the sheet and the adjacent side sill 11. Another plate 24 is provided for each floor sheet 20 extending between bolster 13 and crossbearer 15 and this plate has the same width as the respective floor sheet and is disposed under the adjacent edge of the respective floor sheet and secured to the floor sheet and to the adjacent web plate of the bolster. The opposite edge of each floor sheet 20 extending between bolster 13 and crossbearer 15 is disposed on the top surface of the crossbearer and secured thereto. Thermal insulation 25 is disposed between the floor 19 and the subfloor 20. An auxiliary metal floor sheet 26 extends between the end sill 12 and the bolster 13 and also extends between the center sill 10 and the adjacent side sill 11. Another auxiliary metal floor sheet 26 extends between the bolster 13 and the floor beam 14 and also extends between the center sill 10 and the adjacent side sill 11. Another auxiliary metal floor sheet 26 extends between the floor beam 14 and the crossbearer 15 and also extends between the center sill 10 and the adjacent side sill 11. A plurality of means 27 support the auxiliary floor sheets 26 from the subfloor sheets 20. Each means 27 is comprised of a sleeve 28 extending through the respective auxiliary floor sheet 26 and having one end disposed against the adjacent subfloor sheet 20 at the stringers 16 and against the angles 21 or 22 at the center sill 10 and side sills 11. A metal washer 29 is disposed on each sleeve 28 and is secured to the inner face of the respective auxiliary floor sheet 26 and a rubber washer 30 is disposed on the sleeve and secured thereto and to the washer 29 and a rubber washer 31 is disposed on the sleeve and against the washer 29 and a metal washer 32 is disposed against the lower end of the sleeve and a lock washer 33 is disposed against the washer 32 and a screw 34 is disposed in the sleeve. The screws 34 are of the self-tapping type and are turned through the respective floor sheet 20 and respective stringer lower flange at the stringers 16 and through the angles 21 or 22 and the respective floor sheet adjacent the center sill 10 and side sills 11. There are flexible connections between the edges of the auxiliary floor sheets 26 and the center sill 10 and side sills 11 and crossbearer 15 and floor beam 14 and bolster 13 and end sill 12. At the side sills 11 and at the center sill 10 a metal strip 35 is spaced below the auxiliary floor sheet 26 and has the same length as the respective floor sheet and extends along the respective edge thereof and has one edge disposed adjacent the respective edge and has its opposite edge secured to the floor sheet and a vertically disposed metal strip 36 is spaced from the respective sill and has its lower edge secured thereto and the strip 36 has the same length as the adjacent floor sheet. A strip of rubberized fabric 37 having the same length as strips 35 and 36 is disposed between strip 35 and the respective auxiliary floor sheet 26 and is also disposed between the respective sill and the strip 36. Spaced screws 38 are threaded through strips 35 and 37 and the respective auxiliary floor sheet 26 and other screws 38 are threaded through the strips 36 and 37 and the respective sill. At the crossbearer 15 and floor beam 14 and bolster 13 and end sill 12 the strips 35, 36 and 37 have the same width as the respective floor sheets 26. At the crossbearer 15 the strip 36 is secured to a closing plate 39 which is secured to the adjacent web of the crossbearer and at the floor beam 14 the strips 36 are secured to opposite faces of the web of the floor beam and at the bolster 13 strips 36 are secured to the adjacent web plates of the bolster. At the end sill 12 the strip 36 is secured to a metal sheet 40 which is secured to the end sill and screws 38 are threaded through strips 35, 36 and 37, sheet 40 and the horizontal flange of the end sill and the strip 37 after being secured in place takes a Z-shape. A coating 41 approximately one-eighth inch in thickness is sprayed on the inner faces of the auxiliary floor sheets 26. A pair of layers of sound insulation 42 covered with muslin are disposed between the auxiliary floor 26 and the subfloor 20 and a sheet of felt paper 43 is disposed between the layers 42 of sound insulation. The layers 42 of sound insulation and sheet 43 of felt paper all have lengths substantially the same as the length of the respective auxiliary floor sheet 26 and layers 42 and sheet 43 all have widths substantially the same as the width of the respective auxiliary floor sheet. The auxiliary floor 26 prevents transmission of sound waves to the car structure. The rubberized fabric strips 37 prevent transmission of mechanical vibrations from the auxiliary floor 26 to the car structure. The coating 41 on the auxiliary floor helps keep the sheets 26 from vibrating and generating sound waves. The sound insulation 42 absorbs vibrations that bounce between the auxiliary floor 26 and the subfloor 20. The felt paper sheet 43 provides an additional sound barrier. It is to be noted that the means 27 are flexible so that vibrations in the auxiliary floor 26 are not transmitted to the subfloor 20. Although two layers of sound insulation 42 and a sheet of felt paper 43 have been shown in the drawings a single layer of sound insulation 42 having a thickness equal to the distance between the sheets 26 and 20 may be substituted for the two layers 42 and sheet 43 or a greater number of layers might be substituted.

As stated the external noises generated by the trucks and the travel of a railway vehicle over the roadbed, go through the car structure into the interior of the car. This noise is greatest over the end portions of the car and goes to the center of the car but is not nearly as great here as at the end portions of the car. That is, the noise in the interior of the car at its center is usually not great enough to warrant the railroad having sound barriers at the central portion of the car, however, if the railroad wanted the whole car extremely quiet sound barriers the full length of the car would be desirable.

In the drawings applicant has illustrated the sound barrier as extending from the end sill to the first crossbearer but the illustrated sound barrier arrangement could be provided for the full length of the car. Applicant's illustrated arrangement could be varied by building the regular floor of plywood or metal covered plywood securely enough attached to provide the shear strength normally provided by the subfloor. In this case, the subfloor would be mounted on the plurality of means 27 and have flexible connections at its edges to provide the same sound barrier as described above.

From the foregoing it will be seen that there has been provided a sound barrier for passenger vehicles preventing noises from beneath the vehicle from going into the interior thereof thus giving greater passenger comfort.

What is claimed is:

1. In a passenger vehicle, structural members including a longitudinal center sill member and a pair of side sill members spaced outwardly from the center sill member with a plurality of cross members extending from each side of the center sill member to the respective side sill members and having their top surfaces substantially in the same horizontal plane as the top surface of the center sill member, a floor spaced above said center sill member and said cross members, a subfloor supported on top of said cross members and secured to the structural members, spacing means supporting said floor above said subfloor, an auxiliary floor spaced below the subfloor between said cross members and having its transverse edges spaced from the adjacent cross members and its longitudinal edges spaced from the adjacent structural members, flexible connections between said edges of the auxiliary floor and the adjacent structural members and each of the flexible connections comprising a metal strip having a portion spaced below the auxiliary floor and extending along the respective edge thereof and having one edge disposed adjacent said respective edge of the auxiliary floor and having its opposite edge secured to the auxiliary floor and a metal strip having a portion spaced from the respective one of the structural members and having one edge secured thereto and a strip of rubberized fabric disposed between and secured to the first named metal strip and the auxiliary floor and disposed between and secured to said respective one of the structural members and the second named metal strip, and sound insulation between the auxiliary floor and the subfloor.

2. In a passenger vehicle, structural members including a longitudinal center sill member and a pair of side sill members spaced outwardly from the center sill member with a plurality of cross members extending from each side of the center sill member to the respective side sill members and having their top surfaces substantially in the same horizontal plane as the top surface of the center sill member, a floor spaced above said center sill member and said cross members, a subfloor supported on top of said cross members and secured to the structural members, spacing means supporting said floor above said subfloor, an auxiliary floor spaced below the subfloor between said cross members having its lonigtudinal edges spaced from the adjacent structural members and having its transverse edges spaced from the cross members, a plurality of resilient supports suspending the auxiliary floor from the subfloor, and sound insulation between the auxiliary floor and the subfloor.

3. In a railway passenger car, structural members including a longitudinal center sill and a pair of side sills spaced outwardly from the center sill with a plurality of cross members extending from each side of the center sill to the respective side sills and having their top surfaces substantially in the same horizontal plane as the top surface of the center sill, a floor spaced above said center sill and said cross members, a subfloor supported on top of and secured to said cross members and extending between and secured to the center sill and the adjacent side sill, spacing means supporting said floor above said subfloor, an auxiliary floor spaced below the subfloor extending between the cross members and extending between the center sill and the adjacent side sill with its longitudinal edges spaced from said center sill and side sill and its transverse edges spaced from the adjacent cross members, flexible strips extending between and secured to the edges of the auxiliary floor and the cross members and center sill and the adjacent side sill, and sound insulation between the auxiliary floor and the subfloor.

4. In a railway passenger car, including a longitudinal center sill, a pair of side sills spaced outwardly from the center sill, an end sill on each side of the center sill extending between and secured to the center sill and the adjacent side sill, a bolster on each side of the center sill extending between and secured to the center sill and the adjacent side sill, a floor beam on each side of the center sill extending between and secured to the center sill and the adjacent side sill, a crossbearer on each side of the center sill extending between and secured to the center sill and the adjacent side sill, spaced stringers in the area between the end sill and the boltser and secured to both, spaced stringers disposed on the floor beam and crossbearer and secured to the bolster and floor beam and crossbearer, a floor disposed upon the stringers and secured to the side sills, a subfloor sheet on each side of the center sill extending between and secured to the end sill and the bolster and extending between and secured to the center sill and the adjacent side sill, a subfloor sheet on each side of the center sill extending between the bolster and the crossbearer over the floor beam and secured to the bolster and floor beam and crossbearer and extending between and secured to the center sill and the adjacent side sill, an auxiliary metal floor sheet on each side of the center sill extending between the end sill and the bolster and extending between the center sill and the adjacent side sill and having its adjacent edges spaced from each of said sills and bolster, an auxiliary metal floor sheet on each side of the center sill extending between the bolster and the floor beam and extending between the center sill and the adjacent side sill and having its adjacent edges spaced from each of said sills, bolster and beam, an auxiliary metal floor sheet on each side of the center sill extending between the floor beam and the crossbearer and extending between the center sill and the adjacent side sill and having its adjacent edges spaced from each of said sills, crossbearer and beam, a plurality of supports suspending the auxiliary floor sheets from the subfloor sheets, flexible strips extending between and secured to the edges of the respective auxiliary floor sheets and the end sill and bolster and center sill and the adjacent side sill, flexible strips extending between and secured to the edges of the respective auxiliary floor sheets and the boltser and floor beam and the center sill and the adjacent side sill, flexible strips extending between and secured to the edges of the respective auxiliary floor sheets and the floor beam and crossbearer and the center sill and the adjacent side sill, and sound insulation between the respective auxiliary floor sheet and the respective subfloor sheet.

5. In a railway passenger car, including a longitudinal center sill, a pair of side sills spaced outwardly from the center sill, an end sill on each side of the center sill extending between and secured to the center sill and the adjacent side sill, a bolster on each side of the center sill extending between and secured to the center sill and the adjacent side sill, a floor beam on each side of the center sill extending between and secured to the center sill and the adjacent side sill, a crossbearer on each side of the center sill extending between and secured to the center sill and the adjacent side sill, spaced stringers in the area between the end sill and the bolster and secured to both, spaced stringers disposed on the floor beam and crossbearer and secured to the bolster and floor beam and crossbearer, a floor disposed upon the stringers and secured to the side sills, a subfloor sheet on each side of the center sill extending between and secured to the end sill and the bolster and extending between and secured to the center sill and the adjacent side sill, a subfloor sheet on each side of the center sill extending between the bolster and the crossbearer over the floor beam and secured to the bolster and floor beam and crossbearer and extending between and secured to the center sill and the adjacent side sill, thermal insulation between the subfloor sheet and the floor, an auxiliary metal floor sheet on each side of the center sill extending between the end sill and the bolster and extending between the center sill and the adjacent side sill and having its adjacent edges spaced from each of said sills and bolster, an auxiliary metal floor sheet on each side of the center sill extending between the bolster and the floor beam and extending between the center sill and the adjacent side sill and having its adjacent edges spaced from each of said sills, bolster and beam, an auxiliary metal floor sheet on each side of the center sill extending between the floor beam and the crossbearer and extending between the center sill and the adjacent side sill and having its adjacent edges spaced from each of said sills, cross bearer and beam, a plurality of supports suspending the auxiliary floor sheets from the subfloor sheets, flexible strips extending between and secured to the edges of the respective auxiliary floor sheets and the end sill and bolster and center sill and the adjacent side sill, flexible strips extending between and secured to the edges of the respective auxiliary floor sheets and the bolster and floor beam and the center sill and the adjacent side sill, and flexible strips extending between and secured to the edges of the respective auxiliary floor sheets and the floor beam and crossbearer and the center sill and the adjacent side sill, a pair of layers of sound insulation between the respective auxiliary floor sheet and the respective subfloor sheet, and a sheet of felt paper between said layers of sound insulation, and a coating on the inner face of each of the auxiliary floor sheets.

6. In a wheeled vehicle including a vehicle structure having a plurality of structural members, a floor supported from the vehicle structure, a subfloor spaced below said floor and supported from the vehicle structure, an auxiliary floor spaced below said subfloor, and a horizontally disposed substantially sound impervious layer of material spaced between said subfloor and said auxiliary floor as a barrier to the transmission of sound waves to the vehicle structure, said auxiliary floor having its edges spaced from said structural members, and flexible strips extending between and secured to the edges of the auxiliary floor and said structural members to prevent transmission of vibrations in the auxiliary floor to the vehicle structure.

7. In a wheeled vehicle including a vehicle structure having a plurality of structural members, a floor structure supported from the vehicle structure, an auxiliary floor spaced below said floor structure, and a horizontally disposed substantially sound impervious layer of material spaced below and between said floor structure and said auxiliary floor as a barrier to the transmission of sound waves to the vehicle structure, said auxiliary floor having its edges spaced from said structural members, and flexible strips extending between and secured to the edges of the auxiliary floor and said structural members to prevent transmission of vibrations in the auxiliary floor to the vehicle structure.

References Cited in the file of this patent

UNITED STATES PATENTS

| | | |
|---|---|---|
| 1,156,206 | Brown | Oct. 12, 1915 |
| 1,830,118 | Lord | Nov. 3, 1931 |
| 1,884,372 | Symington | Oct. 25, 1932 |
| 1,926,679 | Kellogg et al. | Sept. 12, 1933 |
| 2,009,614 | Geyer | July 20, 1935 |
| 2,019,052 | Lord | Oct. 29, 1935 |
| 2,160,066 | Frische | May 30, 1939 |
| 2,263,919 | Darragh | Nov. 25, 1941 |